United States Patent [19]

Cheung

[11] Patent Number: 4,745,537
[45] Date of Patent: May 17, 1988

[54] LOW DISSIPATION POWER CONVERTER

[76] Inventor: P. S. Cheung, 18, Newgale St., Nepean, Canada, K2H 5R3

[21] Appl. No.: 6,568

[22] Filed: Jan. 23, 1987

[51] Int. Cl.⁴ ................ H02M 5/458; H02M 7/5387
[52] U.S. Cl. .................................... 363/37; 315/205; 315/226; 331/113 A; 362/219; 363/56; 363/132
[58] Field of Search ............................ 363/37, 132, 56; 331/113 A; 362/219, 375; 315/205 X, 224, 226, 282

[56] References Cited

U.S. PATENT DOCUMENTS

| 3,175,167 | 3/1965 | Lloyd | 331/113 A |
|---|---|---|---|
| 3,317,856 | 5/1967 | Wilkinson | 331/113 A |
| 3,593,060 | 7/1971 | Kryder | 331/113 A |
| 4,104,715 | 8/1978 | Lawson | 363/37 |
| 4,506,318 | 3/1985 | Nilssen | 363/132 |

FOREIGN PATENT DOCUMENTS

| 2402602 | 7/1975 | Fed. Rep. of Germany | 363/37 |
|---|---|---|---|
| 857775 | 1/1961 | United Kingdom | 331/113 A |
| 988742 | 4/1965 | United Kingdom | 315/205 |

Primary Examiner—William H. Beha, Jr
Attorney, Agent, or Firm—Rodman & Rodman

[57] ABSTRACT

A converter of electric power at a first value of voltage and frequency produces a voltage at a second value and at a higher value of frequency by means of an inverter oscillator circuit having two serially connected transistors. An output power transformer is coupled to the transistors for receiving current excitation from alternate ones of the transistors during alternate half-cycles of the output voltage. Incoming voltage is converted by a diode bridge circuit to a DC voltage which drives the transistors. Serially connected capacitors bypass the bridge circuit to couple high frequency current from a primary winding of the transformer through the transistors. Additional windings of the transformer are coupled in the base-emitter circuit of each transistor for inducing states of saturation during conduction phases of each transistor so as to minimize power dissipation within each of the transistors. The transformer has a saturating reactor core which is made to saturate at the end of each half cycle of the output current, the intervals of current saturation resulting in a flux change which reverses the polarities of the windings in the base emitter circuits to alternate the states of conduction of the transistors.

7 Claims, 1 Drawing Sheet

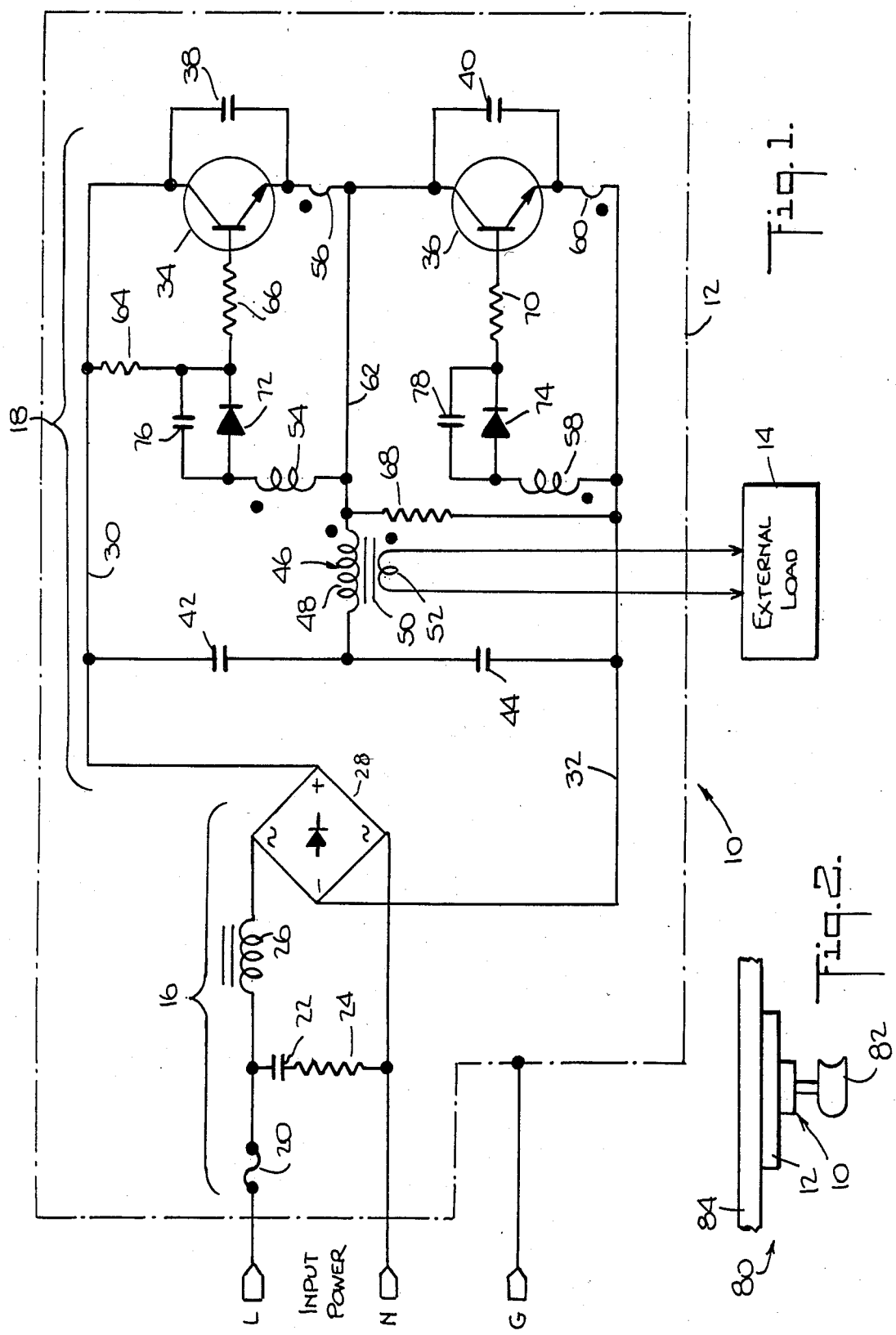

LOW DISSIPATION POWER CONVERTER

BACKGROUND OF THE INVENTION

This invention relates to inverter-type power sources for transforming an AC (alternating current) voltage of a first magnitude to an AC voltage of a second magnitude suitable for driving a load such as a set of lamps or other household appliance. More particularly, the invention relates to a power converter comprising an inverter circuit which minimizes dissipation of power within components of the circuit, to permit a sufficient size reduction for unobtrusive mounting of the converter within an appliance fixture such as a track-lighting fixture.

Transformers have been employed for converting household voltage, for example 110 VAC 60 hertz, to a lower voltage such as 12 VAC for operating an appliance or other electrical load such as a lamp. However, the physical size of a transformer is dependent on the frequency of the alternating current and, at the usual frequency of household electric supply, tends to be too large to accommodate the transformer within an appliance. Accordingly, more modern power conversion devices employ an inverter circuit which includes a transformer and an oscillator operating at substantially higher frequencies so as to minimize the size of the transformer. The physical size of such power conversion devices is dependent on the size of the transformer plus other components such as transistors, capacitors, and any cooling devices such as fins which may be required.

A situation of particular interest is the deployment of a low-voltage power converter in a track lighting fixture. In such lighting fixtures, all the components thereof including the lamp, the track, and a device for securing the lamp to the track are visible, and must be esthetically pleasing for use in the home and in business establishments.

If it is desired to employ lamps which operate on a low voltage, such as 12 volts, it is necessary to provide a transformer or converter for the incoming house voltage of 110-120 volts to reduce the house voltage to the 12 volts required by the lamp. It would be most convenient if such a converter could be physically connected to the lamp in the track lighting fixture because such an arrangement of components would facilitate installation of the track lighting fixture.

The requirement of an esthetic appearance necessitates that the physical configuration of the converter present a relatively small package, of low profile so that the package is less visible and less intrusive to people utilizing the track lighting fixture. Such reduced size can only be accomplished by the use of relatively small electrical components on the converter, and by the construction of a circuit which minimizes the amount of power dissipated within the converter. It is readily apparent that excessive power dissipation within the converter would necessitate special cooling arrangements, such as external fins, and may also necessitate larger circuit components for handling increased power.

A problem that arises in existing circuits is that they do not minimize power dissipation within the electrical components to the fullest extent possible. As a result, attempts to include existing power sources or converters within a track lighting fixture, or other appliance having a high visibility location, without being obtrusive are not usually successful.

SUMMARY OF THE INVENTION

The foregoing problem is overcome and other advantages are provided by an electric power converter which employs an oscillator circuit comprising a pair of transistors coupled to an output transformer, the oscillator circuit operating at a frequency which is substantially higher than the frequency of alternating current commonly applied to homes and business establishments. This arrangement permits a reduction in the size of the output transformer.

In accordance with the invention, two transistors are operated with alternating states of conduction, and are coupled to an output transformer to produce an oscillatory current therein. Inductive circuits are employed for alternately exciting the two transistors by supplying base current thereto, the inductive circuits being magnetically coupled to the output transformer for synchronization of the operations of the transistors, with the oscillatory current in the output transformer.

One feature of the invention is the use of a saturable core in the output transformer. As the current in any one of the transistors increases due to the application of base current to the transistor, a primary winding of the output transformer produces a voltage drop in the oscillator circuit which minimizes a voltage drop across the transistor. The saturable core thus allows minimal power dissipation within the transistor.

With increasing current flow through the transistor and the primary winding of the output transformer, a current level is reached at which the core becomes saturated. At this point, the magnetic properties of the transformer change dramatically resulting in a reversal of voltages experienced in the inductive circuits which feed the base currents. As a result, there is a deenergization of the transistor which has previously been conducting, and an activation of the other transistor.

The deactivated transistor has minimal power dissipation because of a minimal current flow therein. The other transistor has minimal power dissipation because of a minimal voltage drop. Consequently, both transistors can be constructed with small physical size because of the reduced power dissipation requirements. Accordingly, the invention provides for minimization in the size of both the output transformer and the two transistors which drive the output transformer.

The circuitry of the power converter also comprises an input full-wave diode rectifier having output terminals coupled to the transistors, and also a capacitive bypass circuit comprising two capacitors connected in series between the rectifier output terminals. The two transistors are also connected in a series circuit such that center points of the transister circuit and of the capacitive bypass are connected to opposite terminals of the primary winding of the output transformer.

The storage capacity of the capacitors is sufficiently large to provide a low resistance path to the high-frequency currents flowing through the transistors, while allowing a relatively slow change in voltage across the capacitive bypass to follow the voltage waveform output from the full-wave rectifier. This arrangement minimizes the physical size of the capacitors of the bypass.

Additional capacitors, also of small physical size, are placed across the collector-emitter terminal-pair in each of the transistors to protect the transistors from surge voltages, and to facilitate a smooth flow of current in the branches of the oscillator circuit containing the transistors.

The invention additionally provides for minimization of all essential components of the converter circuit to permit miniaturization of the overall configuration of a container which would hold the converter in a typical application, such as the supplying of electric power to a lamp in a track lighting fixture.

DESCRIPTION OF THE DRAWINGS

In the accompanying drawing;

FIG. 1 is a schematic diagram of the circuit of the power converter incorporating one embodiment of the invention; and, FIG. 2 is a simplified schematic diagram thereof, in combination with a track lighting fixture.

Corresponding reference characters indicate corresponding parts throughout the several views of the drawings.

DETAILED DESCRIPTION OF THE INVENTION

A power conversion circuit device incorporating one embodiment of the invention is generally indicated by the reference number 10 in FIG. 1.

The power conversion device 10 converts electric power at a first voltage (input voltage) to electric power at a second voltage different from the first voltage. For example, when the power conversion device 10 is employed in a track lighting fixture in a home, the input voltage is known to have a value in the range of approximately 110-120 volts AC applied between the terminals L and N. The second voltage is preferably an output voltage of approximately 12 volts applied to an external load 14, such as a lamp in the track lighting fixture. A third terminal G grounds a metal container 12 which encloses the device 10.

The device 10 comprises two basic portions, namely, an input portion 16 and a saturating reactor inverter 18. The input portion 16 supplies a full-wave rectifier an unsmoothed DC (direct current) voltage to the inverter 18, the inverter 18 transforming the DC voltage to an AC voltage of different magnitude. It should be noted that the device 10 can be constructed to convert the input voltage at terminals L, N to either a higher or lower voltage applied to the load 14. However, in the preferred embodiment of the invention, it is presumed that the voltage output to the load 14 is smaller than the input voltage, typically 10% of the input voltage.

The input portion 16 comprises a fuse 20, a capacitor 22, a resistor 24, an inductive choke 26, and a full-wave rectifier bridge 28 having four arms, each of which comprises one diode. Input alternating current and voltage are supplied via the fuse 20 and the choke 26 to input terminals of the bridge 28. The bridge 28 converts the alternating voltage to a full-wave rectified DC voltage between lines 30 and 32 coupled to output terminals of the bridge 28. The polarity of line 30 is positive relative to the polarity of line 32.

The choke 26 prevents any conductive noise which may be generated within the inverter 18 from propagating out of the device 10 on an input power line coupled to terminals L and N. The capacitor 22 and the resistor 24 are connected in series between the input power lines to serve as a snubber for absorbing transients which may appear on the input line, thereby protecting the device 10 from such transients. The fuse 20 protects the device 10 in the event of excessive current flow in the input power line.

The inverter 18 comprises two transistors 34 and 36, each of which has a collector terminal, a base terminal and an emitter terminal. Capacitors 38 and 40 are coupled between the collector and emitter terminals of the transistors 34 and 36, respectively. Two capacitors 42 and 44 are connected in series between the lines 30 and 32 to provide a path for current of the transistors 34 and 36 which bypasses the bridge 28.

The inverter 18 further comprises a transformer 46 having a primary winding 48, a saturable reactor core 50 made of magnetic ferrite, pot core SP43019, an output winding 52 coupled to the external load 14, and four control windings 54, 56, 58, and 60 for controlling voltages applied between emitter and base terminals of the transistors 34 and 36. All of the windings 48, 52, and 54-60 are magnetically coupled via the core 50. Dots are shown adjacent the ends of the respective windings of the transformer 46 to indicate polarities of voltages appearing across these windings. The polarities are induced by the magnetic coupling of the windings through the common core 50.

One terminal of the primary winding 48 is coupled to the junction of the capacitors 42 and 44. The opposite terminal of the primary winding 48 is coupled directly via line 62 to the collector terminal of the transistor 36, and via the winding 56 to the emitter terminal of the transistor 34. The two transistors 34 and 36 are serially connected via the winding 56, which winding connects the emitter terminal of the transistor 34 and the collector terminal of the transistor 36. The inverter 18 further comprises four resistors 64, 66, 68, and 70, two diodes 72 and 74, and two capacitors 76 and 78.

In operation, the resistors 64 and 66 are serially connected between the positive power line 30 and the base terminal of the transistor 34 to establish a bias voltage and current which induces a state of conduction for a flow of current between the collector and the emitter terminals of the transistor 34. The base and the emitter terminals of the transistor 36 are coupled via a DC path composed of a the transistor 36 are coupled via a DC path composed of a serial interconnection of the resistor 70, the diode 74, and the windings 58 and 60. This connection between the base and the emitter terminals of the transistor 36 provides, initially, for a state of nonconduction of current between the collector and the emitter terminals of the transistor 36.

The resistors 64 and 68 are serially connected between the power lines 30 and 32 via the winding 54 and a parallel combination of the capacitor 76 and the diode 72. This connection of the resistors 64 and 68 initializes a value of charge and voltage of the capacitor 76. The capacitor 78 has an initial voltage of zero volts due to its connection in parallel with the diode 74 in the aforementioned electrical path connecting the base and the emitter terminals of the transistor 36. The resistor 68 connects between lines 62 and 32 and, therefore, serves to initialize voltages and charges of the capacitors 38, 40, 42 and 44. As shown, the capacitor 38 is connected between line 30 and line 62 via winding 56, and the capacitor 40 is connected between line 62 and line 32 via winding 60.

The winding 54 is serially connected from line 62 via diode 72 and resistor 66 to the base terminal of the transistor 34. The diode 72 has a forward state of conduction in a direction of base current flowing toward the base terminal of the transistor 34. Similarly, the winding 58 is serially connected between line 32 and the base terminal of the transistor 36 via the diode 74 and the resistor 70. The diode 74 has a forward direction of conduction in the direction of base current flow into the transistor 36.

Upon electrical excitation of the device 10, the transistor 34 begins to conduct, resulting in a flow of current via line 62. The current splits between the resistor 68 to the power line 32, and through the primary winding 48 to the capacitors 42 and 44. This current continues to flow and to increase until the reactor core 50 of the transformer 46 saturates, resulting in a sudden change of magnetic flux. The change in flux introduces a negative voltage between the base-emitter terminal pair of the transistor 34 and a positive voltage between the baseemitter terminal pair of the transistor 36. As a result, the transistor 34 ceases conduction and the transistor 36 begins conduction of current between its collector and emitter terminals.

The current in the transistor 36 also passes via line 62 and splits between the resistor 68 and the primary winding 48. In this case the current through the primary winding 48 is in the opposite sense to the current produced therein by conduction of the transistor 34. The current applied to the winding 48 by the transistor 36 continues to increase until the reactor core 50 saturates, resulting in a sudden change of flux. The flux change induces voltages at the windings 54 and 58 which terminate the current in transistor 36 and restart the current in the transistor 34. An oscillation then develops in the inverter portion 18 of the device 10.

The saturating reactor inverter 18 is a free-running oscillator. The oscillation frequency is determined by the time required to saturate the transformer core 50. It should be noted that the diode 72 blocks flow of current from the base-feed resistor 64 to the return power line 32, thereby allowing base current provided by the resistor 64 and 66 to initiate current flow in the transistor 34.

The polling of the windings 46, 54 and 56 provides for voltage drops across these windings which coact to decrease the voltage drop across the transistor 34. Thus, current through the transistor 34 places the transistor 34 in a state of saturation. In the saturation state, the product of the collector current times the voltage drop between the collector and emitter terminals is at a minimum to minimize power dissipated within the transistor 34. During portions of the oscillation cycle wherein current flow is terminated in the transistor 34, power dissipated therein is also minimized by virtue of the product of the zero or near-zero transistor current and the voltage drop between the collector and the emitter terminals.

A similar operating procedure applies to the base drive of the transistor 36. Current provided via the winding 58, the diode 74, and the resistor 70 induces current flow through the transistor 36 during one portion of the oscillation cycle, and terminates current flow through the transistor 36 during the alternate portion of the oscillation cycle. The polling of the windings 48, 58 and 60 provides for voltage drops which tend to reduce the voltage drop between the collector and the emitter terminals of the transistor 36 so as to induce a state of saturation of the transistor 36 during the flow of current therein. Thus, the product of voltage and current at the transistor 36 is minimized during both portions of the oscillation cycle, as is the case described above for the transistor 34.

The capacitors 76 and 78 are smaller in value than the capacitors 42 and 44. The capacitors 76 and 78 serve as speed-up capacitors to ensure rapid changes in the states of current conduction in the transistors 34 and 36 upon attainment of a state of saturation in the core 50.

The capacitors 38 and 40 are smaller in value than the capacitors 76 and 78. The capacitors 38 and 40 provide bypass current paths around the transistors 34 and 36, respectively, to improve transient response in the operation of the device 10.

The resistors 66 and 70, connected in series with the base terminals of the transistors 34 and 36, respectively, serve to limit excessive current drive to the transistors 34 and 36, thereby ensuring proper operation of the transistors. The output voltage applied to the load 14 may be larger or smaller than the voltage at the primary winding 48 depending on the turns ratio of the windings 48 and 52.

The following component values are employed in the construction of the preferred embodiment of the device 10. The fuse 20 is set for 2.5 amperes at 125 volts. The choke 26 has a value of 500 microhenries at a current of 1 ampere. The four diodes employed in the bridge 28 are type 1N5395. The capacitors 22, 42, and 44 have values, respectively, of 0.47, 1.0, and 1.0 respectively, at 250 volts. The capacitors 38 and 40 have equal values of 0.001 microfarads at 500 volts. The capacitors 76 and 78 each have a value of 0.1 microfarad.

The diodes 72 and 74 are each type 1N4004. The transistors 34 and 36 are NPN type 13004. The resistor 24 has a value of 220 ohms with one watt dissipation. The resistors 64 and 68 each have a value of 100,000 ohms. The resistors 66 and 70 each have a value of 3.9 ohms. The frequency of oscillation of the transformer 46 is 25 KHz. The primary winding 48 has thirty-two turns, the output winding 52 has seven turns and the control windings 54, 56, 58 and 60 have seven, one, seven, and one turns, respectively.

It is noted that the frequency of oscillation of the inverter 18 is many fold greater than the frequency of the AC input power to the device 10. Thus, many cycles of current are outputted by the output winding 52 of the transformer 46 to the load 14 during a single cycle of the input power.

As previously noted, in order to conserve physical size of the capacitors 42 and 44, their charge capacity is just large enough to provide high-frequency paths of conduction for current flowing in the transformer 46. However, the capacitors 42 and 44 are not large enough to store voltage imparted thereto by the bridge 28 over the period of time of a cycle of input current. Therefore, the unsmoothed DC voltage appearing between the lines 30 and 32 is understood to vary in amplitude between various portions of the cycle of input power.

During relatively short moments of the input power cycle, when the voltage is near zero, the oscillations of the device 10 may cease until voltage is restored in a latter portion of the input power cycle. Resulting flicker in a lamp of the load 14 would be too small to be noticed. The oscillation is restored immediately upon attainment of a desired voltage between lines 30 and 32 due to the onbiasing of the transistor 34 by the resistors 64 and 66.

Thus, the physical sizes of the capacitors 42 and 64 are minimized. All other capacitors in the device 10 are of smaller value and smaller physical size. Also, as previously noted, the use of high-frequency excitation of the transformer 46 permits the transformer 46 to be constructed with a much smaller physical size than would be the case if the transformer were to operate at the relatively low frequency of electric power provided to households.

FIG. 2 shows a tracklighting fixture 80 in simplified schematic form comprising a lamp 82 secured to a track 84. A transformation of voltage from the relatively high voltage of 110-120 volts to the lamp voltage of 12 volts is accomplished by the power conversion device 10 which is secured to the base portion of the lamp 82 to ride alongside the track 84. The container 12 of the device 10 is shaped with a low profile that is esthetically pleasing as a part of the fixture 80, and is readily moveable along the track 84 with the lamp 82. FIG. 2 thus demonstrates how the power conversion device 10 of the invention can be readily incorporated into a track lighting fixture.

It is to be understood that the above described embodiment of the invention is illustrative only, and that modifications thereof may occur to those skilled in the art. Accordingly, it is intended that all matter contained in the above description or shown in the accompanying drawings shall be interpreted as illustrative and not in a limiting sense.

What is claimed is:

1. An electric power converter comprising:
   a first transistor and a second transistor serially connected between positive and negative terminals of a DC source, each of said transistors comprising an emitter terminal and a base terminal and a collector terminal, the emitter terminal of said first transistor being connected via a first junction point to the collector terminal of said second transistor;
   a power transformer having a primary winding, a secondary winding and a saturable core inductively coupled to said primary and secondary windings;
   a bypass circuit coupled between said positive and said negative terminals of said DC source, said bypass circuit comprising first and second capacitors serially connected at a second junction point, said primary winding being connected between said first junction point and said second junction point;
   means magnetically coupled to said transformer for applying base current alternately to said first and said second transistors to induce states of conduction of current alternately in each of said transistors, the current in each of said transistors passing through said primary winding and inducing a voltage drop across said primary winding during a nonsaturated condition of said transformer core for minimizing power dissipation in each of said transistors, saturation of said transformer core reversing polarity of said current applying means to alternate activation of said two transistors, alternate flow of current in said transistors via said primary winding resulting in an oscillatory current in said primary winding, the oscillatory current inducing a voltage at said secondary winding suitable for operation of a load external to said converter;
   a first transformer winding magnetically coupled to said base-current-applying means and connected between an emitter terminal of said first transistor and a collector terminal of said second transistor; and
   a second transformer winding magnetically coupled to said base-current-applying means and connected between an emitter terminal of said second transistor and a junction of said bypass circuit with said DC source, said first and second tranformer windings acting to decrease voltage across said first and said second transistors respectively during states of conduction in said transistors.

2. A converter according to claim 1 wherein said current applying means comprises a first control winding coupled between the base terminal and the emitter terminal of said first transistor, a second control winding coupled between said base terminal and said emitter terminal of said second transistor, and wherein said first and said second control windings are magnetically coupled via said core to said primary winding and said secondary winding of said power transformer, said control windings being polled relative to each other and to said primary winding for inducing alternate states of conduction between said first transistor and said second transistor.

3. A converter according to claim 2 wherein said current applying means further comprises a first bias circuit coupled between a first output terminal of said DC source and the base terminal of said first transistor providing the function of inducing a state of conduction in said first transistor, a second bias circuit coupled between a second terminal of said DC source and the base terminal of said second transistor providing the function of inducing a state of nonconduction in said second transistor, the functions of said first bias circuit and said second bias circuit being overcome respectively by operation of said first control winding during a flow of current therein and by said second control winding during a flow of current therein.

4. A converter according to claim 3 wherein each of said bias circuits includes a diode and a resistor serially connected to the base terminal of each of said transistors, said converter further comprising a capacitor connected between the collector and the emitter terminals of each of said transistors.

5. A converter according to claim 4 wherein said DC source is a full-wave diode bridge rectifier having a pair of input terminals for receiving alternating current, said DC source including a filter coupled between said input terminals and an external set of terminals for receiving AC power; and wherein
   said oscillatory current has an oscillation frequency many fold higher than the frequency of said AC power, the capacitors of said bypass circuit being sufficiently small to permit a voltage drop across said bypass circuit to follow voltage undulations across said bridge rectifier at a frequency of the alternating current.

6. A converter according to claim 1 further comprising a low profile container for enclosing said transistors, said power transformer, said bypass circuit and said current applying means, said container being suitable for mounting in a track lighting fixture, and wherein said external load is a lamp of said track lighting fixture.

7. A converter according to claim 1 wherein said DC source is a full-wave diode bridge rectifier having a pair of input terminals for receiving alternating current, said DC source including a filter coupled between said input terminals and an external set of terminals for receiving AC power; and wherein
   said oscillatory current has an oscillating frequency many fold higher than the frequency of said AC power, the capacitors of said bypass being sufficiently small to permit a voltage drop across said bypass circuit to follow voltage undulations across said bridge rectifier at a frequency of the alternating current.

* * * * *